United States Patent
Zhao

(10) Patent No.: US 12,540,464 B2
(45) Date of Patent: Feb. 3, 2026

(54) DRAIN VALVE FOR BATHROOM

(71) Applicant: Guangzhou Rising Dragon Recreation Industrial Co., Ltd., Guangzhou (CN)

(72) Inventor: Huaibin Zhao, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 107 days.

(21) Appl. No.: 18/600,791

(22) Filed: Mar. 11, 2024

(65) Prior Publication Data
US 2025/0075479 A1 Mar. 6, 2025

(30) Foreign Application Priority Data
Aug. 31, 2023 (CN) .......................... 202311112736.3

(51) Int. Cl.
*E03C 1/23* (2006.01)
*E04H 4/12* (2006.01)

(52) U.S. Cl.
CPC ......... *E03C 1/2306* (2013.01); *E04H 4/1236* (2013.01); *E03C 1/23* (2013.01); *E03C 2001/2315* (2013.01)

(58) Field of Classification Search
CPC .. E03C 1/2306; E03C 1/23; E03C 2001/2315; E03C 1/04–048; E03C 2001/0414–0418; E04H 4/1236; F16K 11/12; F16K 11/14; F16K 1/482; F16K 1/485; F16K 1/487; F16K 5/0407; F16K 5/0478; F16K 5/08; F16K 27/065; F16K 31/60; F16L 59/161; Y10T 137/5526; Y10T 137/5532
USPC ....... 251/215, 225, 219, 351–353, 319, 347, 251/343, 344, 345, 346, 356; 137/305, 137/306
See application file for complete search history.

(56) References Cited

U.S. PATENT DOCUMENTS

| | | | | |
|---|---|---|---|---|
| 1,080,273 | A * | 12/1913 | Fountain | B65D 83/48 251/353 |
| 5,144,978 | A * | 9/1992 | Brown | B01D 36/001 251/351 |
| 6,053,475 | A * | 4/2000 | Batschied | B67D 3/045 251/351 |
| 6,742,682 | B2 * | 6/2004 | Batschied | B67D 3/045 251/351 |

* cited by examiner

*Primary Examiner* — Craig J Price
(74) *Attorney, Agent, or Firm* — Andrew C. Cheng

(57) ABSTRACT

A drain valve comprises a valve shell and a valve core which comprises an inner core and an outer core. In the process of draining and closing, the outer core and the inner core of the valve is rotated through operating the handle nut and a rotating part, so as to realize the accurate control of the position of the valve core. When draining water, the first through hole and the second through hole are aligned, and then water is drained to the water outlet pipe through the outlet of the valve core, so that the drainage is smooth; when closed, the valve core is completely pushed into the interior, and the internal water is squeezed out, thus reducing the possibility of residual water, effectively preventing the drain valve from being frozen, and ensuring the normal use of the drain valve in cold climates.

10 Claims, 8 Drawing Sheets

DRAIN VALVE FOR BATHROOM

TECHNICAL FIELD

The present invention relates to the technical field of fittings of swimming pool or bathtub, in particular to a drain valve for a bathroom.

BACKGROUND

In the bathroom scene such as bathtub or swimming pool, there are some unreasonable design problems in the use of traditional drain valves. In the traditional drain valve, when the outlet of the valve core is connected to the outlet pipe, the valve core may be displaced due to the squeezing force exerted by the water pressure, which makes it difficult to connect the outlet pipe. At the same time, in the process of use, the position of the valve core may become unstable due to the shaking of the valve core, resulting in unsmooth drainage or failure to completely close the drain port, which brings inconvenience and trouble to users.

In addition, in European and American countries, bathtubs are usually installed outdoors. In cold climate, the outdoor drain valve may suffer another problem, that is, the water trapped in the drain valve may be frozen. Frozen water may block the drain valve, making the valve core and other components unable to operate flexibly, thus affecting the normal use of the drain valve.

Therefore, it is necessary to provide an improved drain valve for a bathroom, which can solve the problems of inconvenient connection of water pipe and shaking of valve core of traditional drain valve, and can be used normally in cold climate to avoid being blocked by frozen water.

SUMMARY

The present invention aims to provide a drain valve for a bathroom, which solves that problem that the traditional drain valve is inconvenient to connect a water pipe and the valve core shakes, and at the same time, the drain valve can be normally used, effectively drain water and be prevented from freezing in a cold climate.

A drain valve for a bathroom, which is used for discharging water from a swimming pool or a bathtub, comprising: a valve shell, comprising a first open end and a second open end in communication with the first open end, wherein an annular protrusion protrudes from a middle part of an inner surface of the valve shell toward an axis of the valve shell, and at least two cutouts are defined in the annular protrusion; a valve core comprising a valve inner core and a valve outer core, wherein the valve inner core comprises a cylindrical valve inner core body and at least one first slide rail arranged on an outer side wall of the cylindrical valve inner core body; one end of the cylindrical valve inner core body is closed, and a spherical seal is arranged at the end, and a first through hole communicated with an inside space of the cylindrical valve inner core body is provided at a side of the end; another end of the cylindrical valve inner core body is provided with a water outlet, and an outer surface of another end of the cylindrical valve inner core body is provided with an external thread, and the external thread is threadedly connected with a handle nut; and an end of the first slide rail close to the water outlet defines a notch concaved toward an axis of the cylindrical valve inner core body. The valve outer core is rotatably sleeved outside the valve inner core, and the valve outer core comprises a cylindrical valve outer core body and at least one valve outer core arc-shaped sheet part arranged at an end of the cylindrical valve outer core body, wherein the cylindrical valve outer core body is sleeved on the one end of the valve inner core, and the cylindrical valve outer core body comprises a convex part formed at an end thereof close to the valve outer core arc-shaped sheet part, and an outer diameter of the convex part is the same as an inner diameter of the valve shell; and a second through hole corresponding to the first through hole is defined in the cylindrical valve outer core body; a second slide rail is arranged on an outer surface of the valve outer core arc-shaped sheet part; a notch concave toward the axis of the cylindrical valve inner core body is defined in an end of the second slide rail far away from the water outlet; and a rotating part for controlling rotation of the valve outer core relative to the valve inner core is arranged on an end of the valve outer core arc-shaped sheet part far away from the cylindrical valve outer core body, wherein lengths of the first slide rail and the second slide rail are equal to a distance from an end of an accommodating space inside the valve shell to the annular protrusion.

Preferably, the annular protrusion defines four cutouts which are symmetrically arranged in pairs, and a radian between two adjacent grooves is 70-120 degrees.

Preferably, a pair of opposite first slide rails are arranged on the outer side wall of the cylindrical valve inner core body, and two opposite valve outer core arc-shaped sheet parts are arranged at the end of the cylindrical valve outer core body, and the valve outer core arc-shaped sheet parts are respectively arranged between the two first slide rails.

Preferably, the radians of the two valve outer core arc-shaped sheet parts are 90 degrees.

Preferably, two first annular grooves are formed in the convex part of the cylindrical valve outer core body, and the first annular grooves are provided with first rubber rings.

Preferably, two second annular grooves are arranged at a connection position between the valve inner core and the cylindrical valve outer core body, and the second annular grooves are provided with second rubber rings.

Preferably, a rubber ring is arranged between the spherical seal and the cylindrical valve inner core body.

Preferably, an inner diameter of the first open end is the same as a diameter of the spherical seal.

Preferably, the second open end is provided with a surface cover.

Preferably, the outer surface of the valve shell is provided with an external thread and a fastener with an internal thread, and a thermal insulation material layer is arranged between the fastener and the surface cover Compared with the prior art, the present invention has the following beneficial effects: the present invention provides a drain valve for a bathroom, which comprises a valve shell and a valve core, wherein the valve core comprises a valve inner core and a valve outer core. Through the combined design of the valve inner core and the valve outer core, the valve core can be stably fixed inside the valve shell during use, and will not be displaced due to water pressure, thus ensuring the stability and reliability of the water outlet when connecting the water pipe, and solving the problem of difficulty in connecting the water outlet pipe. In the process of draining and closing, the outer core and the inner core are driven to rotate through operation of the handle nut and rotating parts, so as to realize the accurate control of the position of the valve core. When draining water, the first through hole and the second through hole are aligned, and then water is drained to the water outlet pipe through the outlet of the valve core, so that the drainage is smooth. When closed, the valve core is completely pushed into the interior of the valve shell, and the internal water is squeezed out, thus reducing the possibility of residual water, effectively preventing the drain valve from being frozen, and ensuring the normal use of the drain valve in cold climates such as Europe and American countries. Therefore, the drain valve for a bathroom has the advantages of convenient use, simple operation, smooth drainage and anti-freezing.

Figure 1:
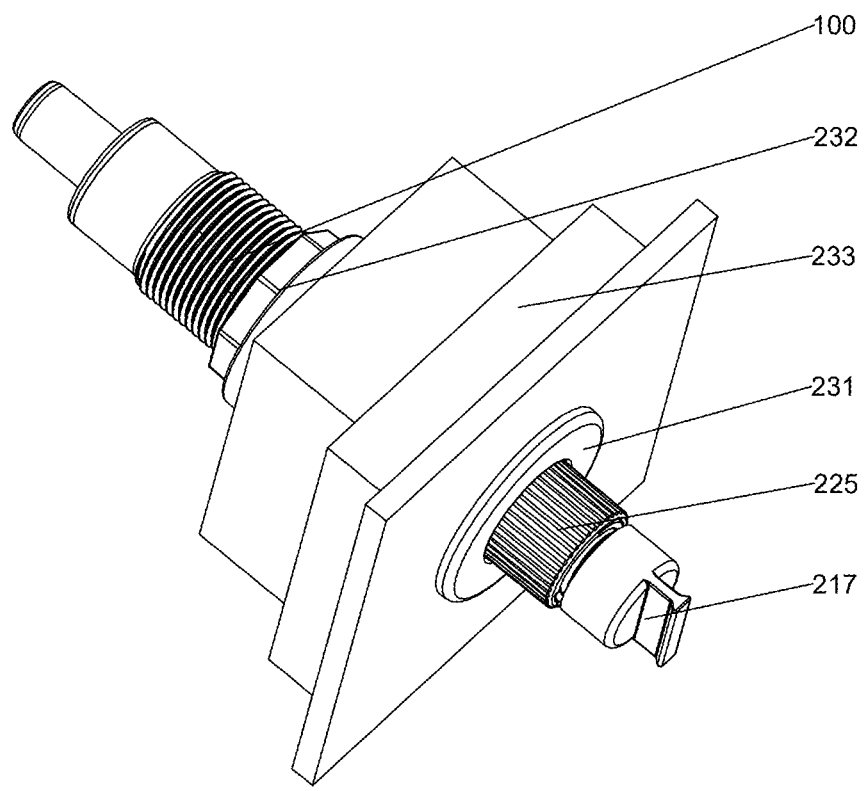
FIG. 1 is a schematic diagram of the installation of the drain valve for a bathroom according to the present invention.
Figure 2:
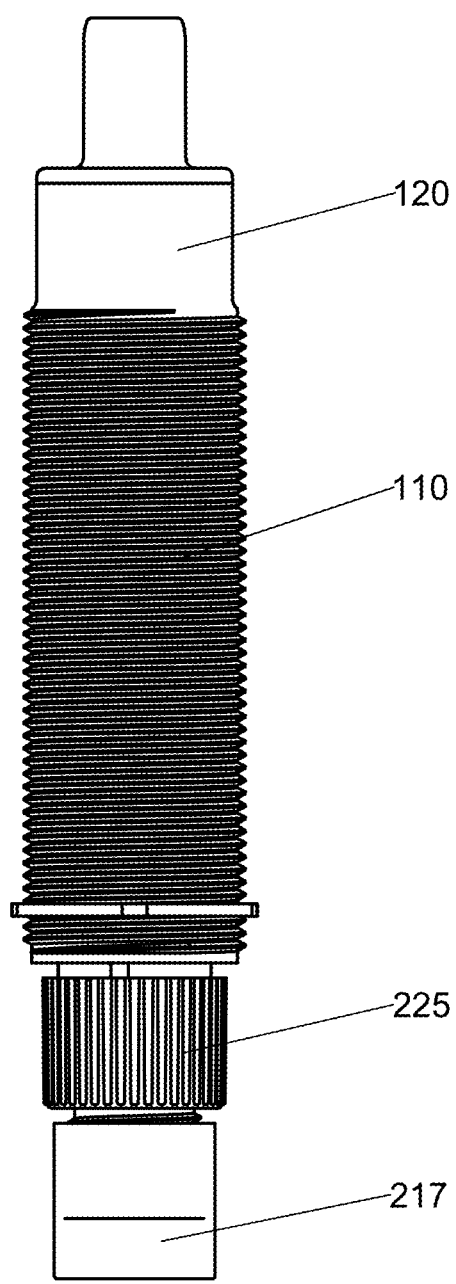
FIG. 2 is a schematic diagram of the three-dimensional structure of the drain valve for a bathroom according to the present invention.
Figure 3:
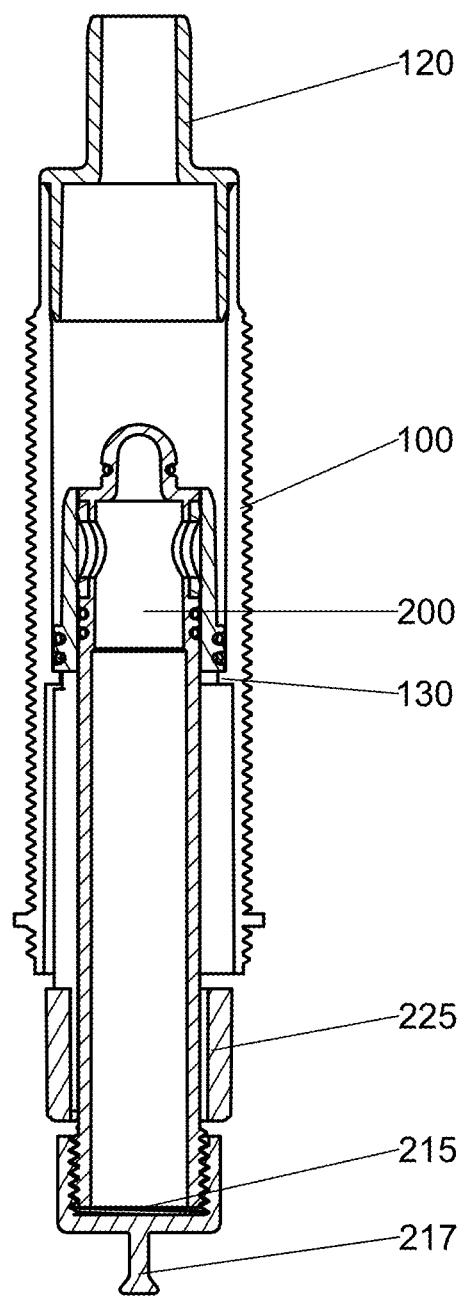
FIG. 3 is a schematic sectional view of the drain valve for a bathroom according to the present invention.

In the figures:
100—Valve shell, 200—Valve core, 110—Cylindrical valve shell body, 120—Connector, 130—Annular protrusion, 140—Cutout, 210—Valve inner core, 220—Valve outer core, 211—Cylindrical valve inner core body, 212—First slide rail, 213—Spherical seal, 214—First through hole, 215—Water outlet, 217—handle nut, 218—Notch, 219—Sealing gasket, 21—Cylindrical valve outer core body, 222—Valve outer core arc-shaped sheet, 223—Second through hole, 224—Second slide rail, 225—Rotating part, 226—First annular groove, 227—First rubber ring, 228—Second annular groove, 229—Second rubber ring, 230—Third rubber ring, 231—Surface cover, 232—Fastener, 233—Insulation material layer.

DESCRIPTION OF EMBODIMENTS

The embodiments described below are only part of the embodiments of the present invention, but not all of them. Based on the embodiments in the present invention, all other embodiments obtained by those skilled in the art without creative work belong to the scope of protection of the present invention.

Embodiment 1

Referring to FIGS. 1-8, Embodiment 1 provides a drain valve for a bathroom, which is used for discharging water from a swimming pool or bathtub. The drain valve includes a valve shell 100 and a valve core 200.

Referring to FIG. 2, FIG. 3, FIG. 7 and FIG. 8, the valve shell 100 includes a first open end and a second open end in fluid communication with the first open end. An annular protrusion 130 protrudes from the middle part inside the valve shell 100 toward the axial in the longitudinal direction of the valve shell 100. At least two grooves 140 are provided on the annular protrusion 130. Specifically, the valve shell 100 includes a hollow cylindrical valve shell body 110 and a connector 120 with a T-shaped cross section. One end of the hollow cylindrical valve shell body 110 is sleeved outside the head end of the connector 120, the vertical end of the connector 120 is set as the first open end of the valve shell 100, the end of the cylindrical valve shell body 110 far away from the connector 120 is set as the second open end of the valve shell 100, and the annular protrusion 130 is arranged at the inner side of the center of the cylindrical valve shell body 110.

Figure 4:
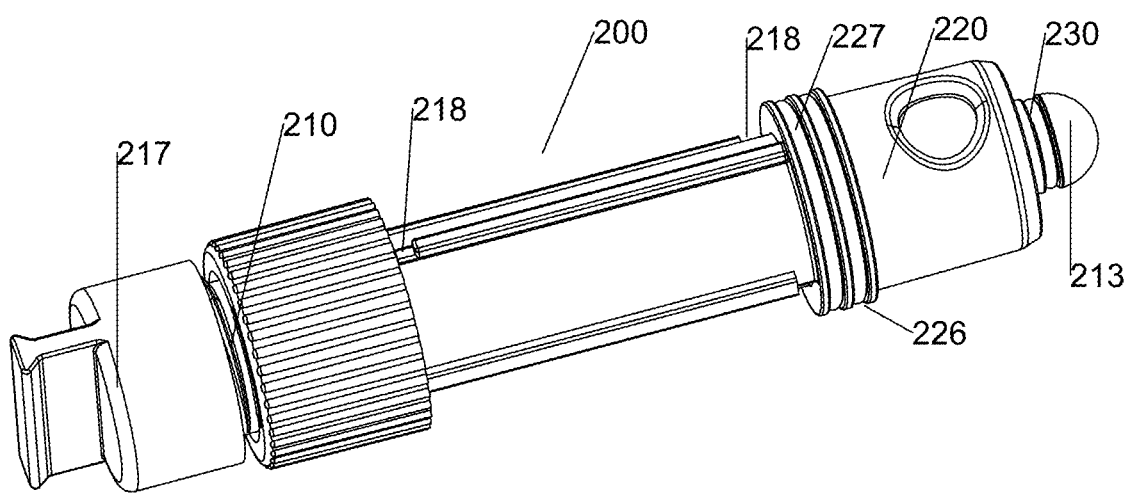
FIG. 4 is a schematic diagram of the three-dimensional structure of the valve core according to the present invention.
Figure 5:
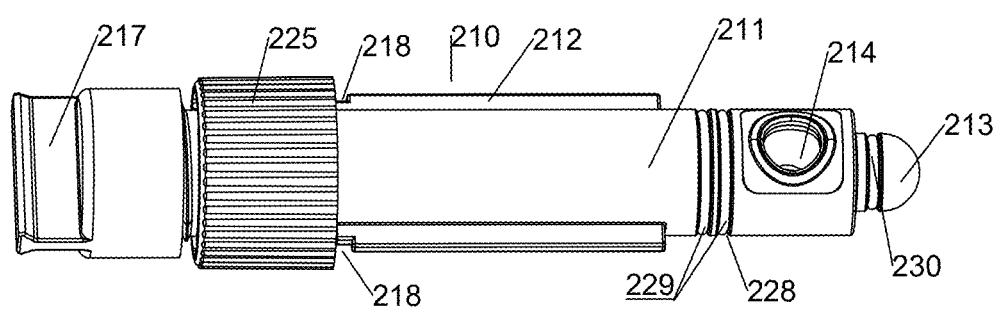
FIG. 5 is a schematic diagram of the three-dimensional structure of the valve inner core according to the present invention.

Referring to FIGS. 4 and 5, the valve core 200 includes a valve inner core 210 and an outer valve core 220, wherein the valve inner core 210 includes a cylindrical valve inner core body 211 and at least one first slide rail 212 arranged on the outer side wall of the cylindrical valve inner core body 211. One end of the cylindrical valve inner core body 211 is closed, and a spherical seal 213 is arranged at the terminal of the end; and the side wall of this end defines a first through hole 214 communicating with the inside space of the cylindrical valve core body 211, and the other end of the cylindrical valve core body 211 defines a water outlet 215, and the outer circumferential surface of the other end of the cylindrical valve core body 211 is provided with an external thread. A handle nut 217 is connected with the external thread. The end of the first slide rail 212 close to the water outlet 215 is provided with a notch 218 which is sunken toward the axis of the cylindrical valve core body 211. A sealing gasket 219 is arranged in the handle nut 217 and disposed at the contact area between the handle nut and the water outlet 215.

Figure 6:
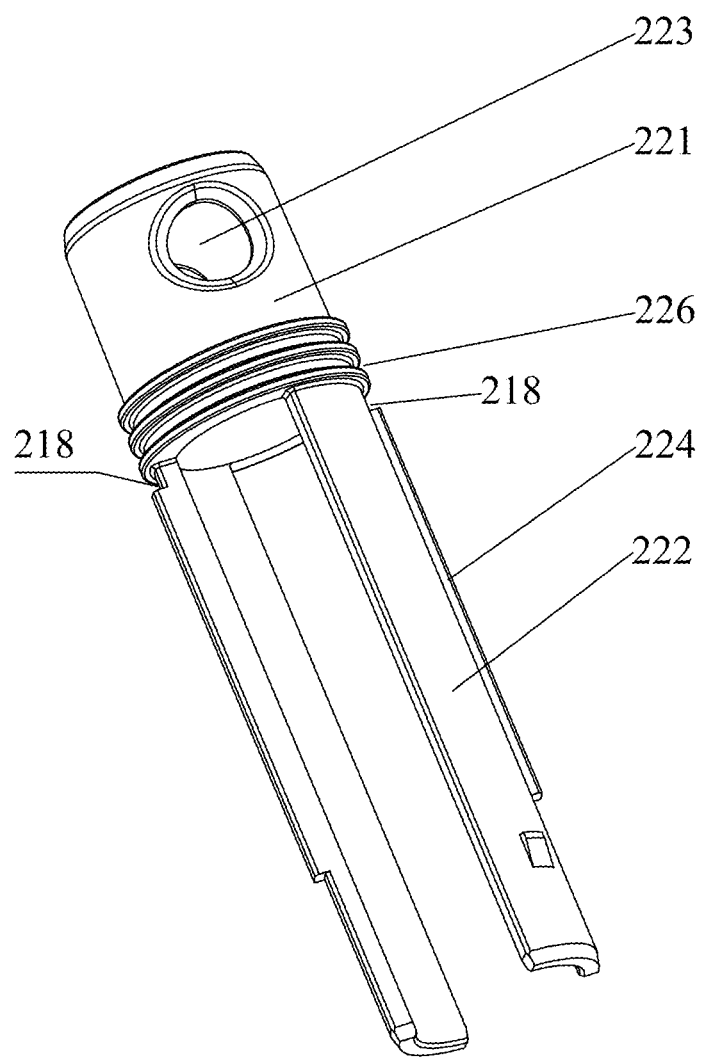
FIG. 6 is a schematic diagram of the three-dimensional structure of the valve outer core according to the present invention.

Referring to FIG. 4 and FIG. 6, the valve outer core 220 is rotatably sleeved outside the valve inner core 210. The valve outer core 220 includes a cylindrical valve outer core body 221 and at least one valve outer core arc-shaped sheet part 222 arranged at the end of the cylindrical valve outer core body 221. The cylindrical valve outer core body 221 is sleeved on one end of the valve inner core 210, and its part near the valve outer core arc-shaped sheet part 222 is convexly arranged to form a convex part. The outer diameter of the convex part of the cylindrical valve outer core body 221 is the same as the inner diameter of the valve shell 100, and the cylindrical valve outer core body 221 defines a second through hole 223 corresponding to the first through hole 214. The outer side of the valve outer core arc-shaped sheet-shaped part 222 is provided with a second slide rail 224, and the end of the second slide rail 224 far away from the water outlet 215 defines a notch 218 that is concave toward the axis of the cylindrical valve inner core body 211. An end of the valve outer core arc-shaped sheet part 222 far away from the cylindrical valve outer core body 221 is provided with a rotating part 225 for controlling rotation of the valve outer core 220 relative to the valve inner core 210. The lengths of the first slide rail 212 and the second slide rail 224 are equal to the distance from the end of the accommodating space inside the valve shell 100 to the annular protrusion 130, which facilitates the annular protrusion 130 to engage in the notch 218.

Figure 7:
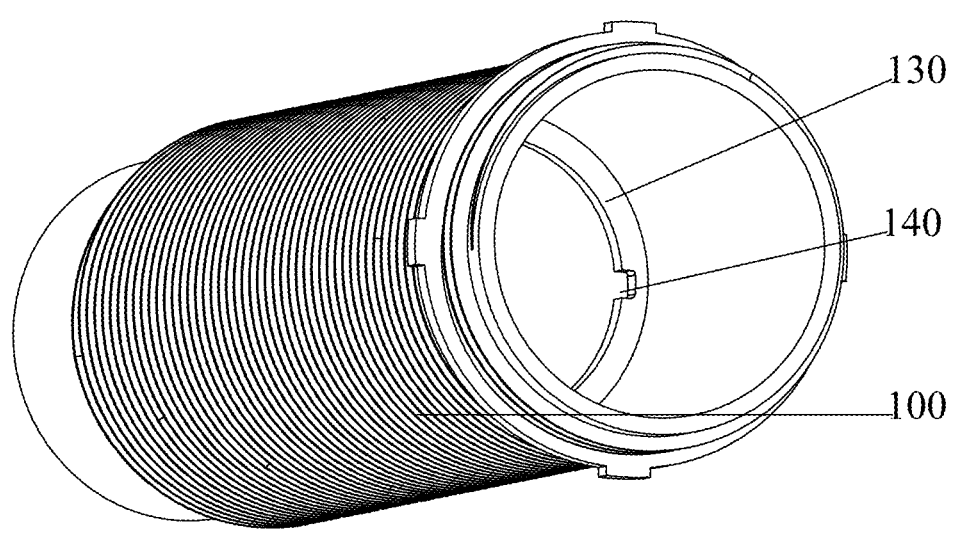
FIG. 7 is a schematic diagram of the three-dimensional structure of the valve shell according to the present invention.
Figure 8:
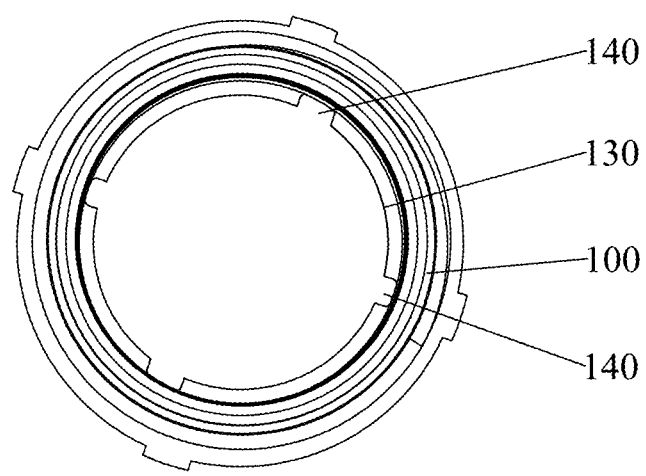
FIG. 8 is a schematic plan view of the valve shell according to the present invention.

The annular protrusion 130 defines four cutouts which are symmetrically arranged in pairs, and the radian between two adjacent cutouts is 70-120 degrees. Referring to FIG. 7 and FIG. 8, specifically, in this embodiment, four cutouts 140 are evenly distributed on the annular protrusion 130, and the radian between two adjacent cutouts 140 is 90 degrees. Preferably, a pair of opposite first slide rails 212 are arranged on the outer side wall of the cylindrical valve inner core body 211, and two opposite valve outer core arc-shaped sheet parts 222 are arranged at the end of the cylindrical valve outer core body 221, and the valve outer core arc-shaped sheet parts 222 are respectively arranged between the two first slide rails 212. Further, the radian of the two valve outer core arc-shaped sheet parts 222 is 90 degrees. It should be noted that the four cutouts 140 include two groups of cutouts 140 arranged opposite to each other, one group of cutouts 140 arranged opposite to each other is used to adapt to the first slide rail 212, and the other group of cutouts 140 arranged opposite to each other is used to adapt to the second slide rail 224, and the second slide rail 224 is arranged at the side edge of the arc-shaped sheet. When the arc-shaped sheet part rotates, one side edge of the arc-shaped sheet part 222 abuts against the side edge of the first slide rail 212. At this time, the radian between the second slide rail 224 and the first slide rail 212 is 90 degrees, that is to say, the connecting lines of the two second slide rails 224 and the connecting lines of the two first slide rails 212 are perpendicular to each other. In this state, the valve core 200 can extend or retract relative to the valve shell 100. When the side edge of the arc-shaped sheet part does not abut against the side edge of the first slide rail 212, it means that the notch 218 of the first slide rail 212 or the second slide rail 224 abuts against the annular protrusion 130, and at this time, the valve core 200 will not move relative to the valve shell 100. It should also be noted that, in this embodiment, the number of the first through holes 214 and the second through holes 223 are both two and arranged oppositely. When the second slide rail 224 is in contact with the first slide rail 212, the first through holes 214 arranged oppositely on the valve inner core 210 completely align with the second through hole 223 arranged oppositely on the valve outer core 220, and the drainage effect is the best at this time.

With reference to FIG. 4 and FIG. 6, it is preferable that two first annular grooves 226 are formed in the protruding part of the cylindrical valve outer core body 221, and the first annular grooves 226 are provided with first rubber rings 227. The first rubber ring 227 takes up the gap between the valve shell 100 and the protruding part of the core body 221 of the valve core 200, so that water will not flow into the gap between the valve core 200 and the inner side of the valve shell 100, and the problem that the drain valve will be frozen in cold areas due to too much water is avoided. It should be noted that the outer diameter of the front part of the cylindrical valve outer core body 221 is set to be smaller than the inner diameter of the valve shell 100, so that water can reach the first through hole 214 and the second through hole 223 via the gap formed between the cylindrical valve outer core body 221 and the valve shell 100 and then flow out.

Referring to FIG. 5, it is preferable that two second annular grooves 228 are formed at the joint between the valve inner core 210 and the cylindrical valve outer core body 221, and second rubber rings 229 are arranged on the second annular grooves 228. Therefore, water will only flow out from the first through hole 214 and the second through hole 223 and then through the valve inner core 210, and will not flow through the gap between the cylindrical valve outer core body 221 and the valve inner core 210, thereby reducing the internal water storage and preventing the drain valve from being frozen in cold areas.

Referring to FIG. 5, it is preferable that a third rubber ring 230 is arranged between the spherical seal 213 and the cylindrical valve core body 211. When the drain valve does not discharge water, the spherical seal 213 abuts against a position of the connector 120 where a first open end is defined, thereby realizing sealing of the first open end of the connector 120, preventing the water in the bathtub from entering the valve shell 100, and preventing the drain valve from being frozen in cold areas. Preferably, the inner diameter of the first open end is the same as the diameter of the spherical seal 213, so that the first open end can be better sealed.

Referring to FIG. 1, it is preferable that the second open end is provided with a surface cover 231. Further, the outer surface of the valve shell 100 is provided with external threads and a fastener 232 with internal threads, and a thermal insulation material layer 233 is arranged between the fastener 232 and the surface cover 231. During installation, the cover 231 abuts against the bathtub wall, and at the same time, the outer side of the valve shell 100 in the bathtub wall is provided with a thermal insulation material layer 233, so that the interior of the valve shell 100 can be insulated to avoid freezing, and then the drain valve can be installed by tightening the fastener 232.

It should be noted that when the drain valve does not drain water, the notch 218 defined in the first slide rail 212 abuts against/engages the annular protrusion 130 defined in the valve shell 100. At this time, the spherical seal 213 is tightly blocked at the connector 120. Although the water in the bathtub will apply a water pressure to push the valve core 200, the notch 218 abuts against the annular protrusion 130 defined in the valve shell 100, and the whole valve core 200 will not be pushed out and the whole valve core 200 is installed stably. When the drain valve needs to drain water, the handle nut 217 can be operated to drive the valve inner core 210 to rotate relative to the valve outer core 220. At this time, the second slide rail 224 formed in the valve outer core 220 is located at the cutout 140 defined in the annular protrusion 130, therefore the valve outer core 220 will not rotate, but only the valve inner core 210 rotates, and the first slide rail 212 formed on the valve inner core 210 will be aligned with the corresponding cutout 140. After the alignment, water pressure will be exerted on the valve core 200. Both the second slide rail 224 and the first slide rail 212 will slide along the cutout 140, and then the valve core 200 will be extruded. When extruded to the outermost side, the first slide rail 212 will be located in the cutout 140, therefore the valve inner core 210 will not rotate. At this time, the valve outer core 220 of the rotating piece 225 drives the valve outer core 220 to rotate by a certain angle, so that the notch 218 defined in the second slide rail 224 will abut against the annular protrusion 130. At this time, even if a force is applied to the valve core 200 toward the first open end, the valve core 200 will not be retracted into the interior because the notch 218 defined in the second slide rail 224 abuts against the annular protrusion 130. At this time, a water outlet pipe can be connected at the water outlet 215 of the valve inner core 210, and then the rotating part 225 contained in the valve outer core 220 drives the valve outer core 220 to rotate by a certain angle, so that the first through hole 214 is aligned with the second through hole 223, and then water can enter through the first through hole 214 and the second through hole 223, and then reach the water outlet pipe through the valve inner core 210 to be discharged. When the drainage is completed, the outlet pipe is detached, and at the same time, the rotating part 225 is rotated in the opposite direction to align the second slide rail 224 with the cutout 140, and then the valve core 200 can be pushed into the valve shell 100 by applying a force toward the first open end, and then the inner valve core 210 can be driven to rotate by a certain angle relative to the valve outer core 220 by operating the handle nut 217, so that the valve core 200 can be locked. It should be noted that the outer side of the rotating part 225 is provided with anti-slip teeth, which is convenient for rotation, and the connection between the rotating part 225 and the arc-shaped sheet part is a snap-fit connection.

The present invention provides a drain valve for a bathroom, which includes a valve shell 100 and a valve core 200, wherein the valve core 200 includes a valve inner core 210 and a valve outer core 220. Through the combination of the valve inner core 210 and the valve outer core 220, the valve core 200 can be stably fixed inside the valve shell 100 during use, and will not be displaced due to water pressure, thus ensuring the stability and reliability of the water outlet 215 when connecting the water pipe, and solving the problem of difficulty in connecting the water outlet pipe. In the process of draining and closing, the valve outer core 220 and the valve inner core 210 are driven to rotate through the handle nut 217 and the rotating part 225, so that the position of the valve core 200 can be accurately controlled. When draining, the first through hole 214 and the second through hole 223 are aligned, and then water is drained to the water outlet pipe through the water outlet 215 of the valve core 200, so that the drainage is smooth; when closed, the valve core 200 is completely pushed into the interior of the valve shell 100, and the internal water is squeezed out, thus reducing the possibility of residual water, effectively preventing the drain valve from being frozen, and ensuring the normal use of the drain valve in cold climates such as Europe and America countries. Therefore, the drain valve for a bathroom has the advantages of convenient use, simple operation, smooth drainage and anti-freezing.

Embodiment 2

Embodiment 2 is basically the same as Embodiment 1, but the difference is that there are two grooves on the annular protrusion 130, and the radian between the two grooves is 90 degrees. Correspondingly, the number of the first slide rails is 1, and the end of the cylindrical valve outer core body is provided with a valve outer core arc-shaped sheet with a radian of 90 degrees. When the side edge of the valve outer core arc-shaped sheet abuts against the side edge of the first slide rail, the radian of the section between the second slide rail and the first slide rail arranged on the valve outer core arc-shaped sheet part is 90 degrees. At this time, the second slide rail and the first slide rail are aligned with corresponding cutouts, and the valve core can extend or retract relative to the valve shell. When the side edge of the arc-shaped sheet part does not abut against the side edge of the first slide rail, it means that the notch of the first slide rail or the second slide rail abuts against the annular protrusion, and at this time, the valve core is not moveable relative to the valve shell.

The preferred embodiments of the present invention disclosed above are only used to help explain the present invention, and are not limited to the specific embodiments described. Obviously, according to the contents of this specification, it can be modified and changed. The embodiment selected and specifically described in this specification is to better explain the principle and practical application of the present invention, so that the technicians in the technical field can better understand and make use of the present invention, and it is not a limitation of the present invention. Any solution after simple modification of the present invention shall belong to the protection scope of the present invention.

What is claimed is:

1. A drain valve for a bathroom or a swimming pool, which is used for discharging water from the swimming pool or a bathtub, comprising:
   a valve shell, comprising a first open end and a second open end in communication with the first open end, wherein an annular protrusion protrudes from a middle part of an inner surface of the valve shell toward an axis of the valve shell, and at least two cutouts are defined in the annular protrusion;
   a valve core comprising a valve inner core and a valve outer core, wherein the valve inner core comprises a cylindrical valve inner core body and at least one first slide rail arranged on an outer side wall of the cylindrical valve inner core body; one end of the cylindrical valve inner core body is closed, and a spherical seal is arranged at the end, and a first through hole communicated with an inside space of the cylindrical valve inner core body is provided at a side of the end; another end of the cylindrical valve inner core body is provided with a water outlet, and an outer surface of said another end of the cylindrical valve inner core body is provided with an external thread, and the external thread is threadedly connected with a handle nut; and an end of the first slide rail close to the water outlet defines a notch concaved toward an axis of the cylindrical valve inner core body;
   wherein the valve outer core is rotatably sleeved outside the valve inner core, and the valve outer core comprises a cylindrical valve outer core body and at least one valve outer core arc-shaped sheet part arranged at an end of the cylindrical valve outer core body, wherein the cylindrical valve outer core body is sleeved on the one end of the valve inner core, and the cylindrical valve outer core body comprises a convex part formed at an end thereof close to the valve outer core arc-shaped sheet part; and a second through hole corresponding to the first through hole is defined in the cylindrical valve outer core body; a second slide rail is arranged on an outer surface of the valve outer core arc-shaped sheet part; a notch concave toward the axis of the cylindrical valve inner core body is defined in an end of the second slide rail far away from the water outlet; and a rotating part for controlling rotation of the valve outer core relative to the valve inner core is arranged on an end of the valve outer core arc-shaped sheet part far away from the cylindrical valve outer core body, wherein lengths of the first slide rail and the second slide rail are equal to a distance from an end of an accommodating space inside the valve shell to the annular protrusion.

2. The drain valve for a bathroom according to claim 1, wherein the annular protrusion defines four cutouts which are symmetrically arranged in pairs, and an angle between two adjacent grooves is 70-120 degrees.

3. The drain valve for a bathroom according to claim 2, wherein a pair of opposite first slide rails are arranged on the outer side wall of the cylindrical valve inner core body, and two opposite valve outer core arc-shaped sheet parts are arranged at the end of the cylindrical valve outer core body, and the valve outer core arc-shaped sheet parts are respectively arranged between the two first slide rails.

4. The drain valve for a bathroom according to claim 3, wherein the two valve outer core arc-shaped sheet parts are located opposite from each other.

5. The drain valve for a bathroom according to claim 1, wherein two first annular grooves are formed in the convex part of the cylindrical valve outer core body, and the first annular grooves are provided with first rubber rings.

6. The drain valve for a bathroom according to claim 5, wherein two second annular grooves are arranged at a connection position between the valve inner core and the cylindrical valve outer core body, and the second annular grooves are provided with second rubber rings.

7. The drain valve for a bathroom according to claim 1, wherein a rubber ring is arranged between the spherical seal and the cylindrical valve inner core body.

8. The drain valve for a bathroom according to claim 1, wherein an inner diameter of the first open end is the same as a diameter of the spherical seal.

9. The drain valve for a bathroom according to claim 1, wherein the second open end is provided with a surface cover.

10. The drain valve for a bathroom according to claim 9, wherein the outer surface of the valve shell is provided with an external thread and a fastener with an internal thread, and a thermal insulation material layer is arranged between the fastener and the surface cover.

\* \* \* \* \*